United States Patent
Choi et al.

(10) Patent No.: US 9,170,457 B2
(45) Date of Patent: Oct. 27, 2015

(54) LIQUID CRYSTAL LENS PANEL AND METHOD OF MANUFACTURING THE SAME

(75) Inventors: Suk Choi, Seongnam-si (KR); Sung-Hwan Hong, Suwon-si (KR); Su-Jin Kim, Seoul (KR); Hyeok-Jin Lee, Seongnam-si (KR)

(73) Assignee: SAMSUNG DISPLAY CO., LTD. (KR)

(*) Notice: Subject to any disclaimer, the term of this patent is extended or adjusted under 35 U.S.C. 154(b) by 395 days.

(21) Appl. No.: 13/547,321

(22) Filed: Jul. 12, 2012

(65) Prior Publication Data

US 2013/0169913 A1 Jul. 4, 2013

(30) Foreign Application Priority Data

Jan. 2, 2012 (KR) .................. 10-2012-0000016

(51) Int. Cl.
| | |
|---|---|
| *G02F 1/1333* | (2006.01) |
| *G02F 1/1339* | (2006.01) |
| *G02F 1/1343* | (2006.01) |
| *G02F 1/1337* | (2006.01) |
| G02F 1/1335 | (2006.01) |
| G02F 1/29 | (2006.01) |

(52) U.S. Cl.
CPC .......... *G02F 1/1337* (2013.01); *G02F 1/13394* (2013.01); *G02F 1/1339* (2013.01); *G02F 1/133512* (2013.01); *G02F 1/29* (2013.01)

(58) Field of Classification Search
CPC .................. G02F 1/13394; G02F 1/133512
USPC ..................................... 349/15, 153
See application file for complete search history.

(56) References Cited

U.S. PATENT DOCUMENTS

| | | | |
|---|---|---|---|
| 6,373,547 B2* | 4/2002 | Saito et al. ............. | 349/155 |
| 7,791,705 B2 | 9/2010 | Jang et al. | |
| 2003/0025868 A1* | 2/2003 | Hiroshima et al. ........ | 349/156 |
| 2005/0219436 A1* | 10/2005 | Kwon et al. ............. | 349/44 |
| 2009/0079928 A1 | 3/2009 | Ohashi et al. | |
| 2010/0045916 A1* | 2/2010 | Kim et al. ............... | 349/138 |
| 2011/0032438 A1* | 2/2011 | Yun et al. ............... | 349/15 |

FOREIGN PATENT DOCUMENTS

JP 2008083315 A 4/2008

* cited by examiner

*Primary Examiner* — Wen-Ying P Chen
(74) *Attorney, Agent, or Firm* — Cantor Colburn LLP (57) ABSTRACT

A liquid crystal lens panel includes a plurality of lens electrodes, an alignment layer, a sealant and a light blocking pattern. The lens electrodes are arranged in an active region. The alignment layer is disposed in an alignment region which overlaps an entire of the active region and extends further than the active region. The sealant is disposed in a seal line region which is outside the alignment region. The light blocking pattern is disposed in the light blocking region which is between the seal line region and the alignment region.

20 Claims, 9 Drawing Sheets

LIQUID CRYSTAL LENS PANEL AND METHOD OF MANUFACTURING THE SAME

This application claims priority to Korean Patent Application No. 10-2012-0000016, filed on Jan. 2, 2012, and all the benefits accruing therefrom under 35 U.S.C. §119, the contents of which are herein incorporated by reference in its entirety.

BACKGROUND OF THE INVENTION

1. Field of the Invention

Exemplary embodiments of the invention relate to a liquid crystal lens panel and a method of manufacturing the liquid crystal lens panel. More particularly, exemplary embodiments of the invention relate to a liquid crystal lens panel having improved reliability and optical characteristics, and a method of manufacturing the liquid crystal lens panel.

2. Description of the Related Art

A display apparatus capable of displaying a three-dimensional ("3D") image has been used in various fields such as including game devices, film devices, etc. The 3D image display apparatus displays different two-dimensional images to eyes of a viewer so that the 3D image is displayed. That is, the viewer recognizes the two-dimensional plane images through the eyes, and the two-dimensional images are mixed in a brain of the viewer, so that the viewer may perceive the 3D image.

The 3D image display apparatus is classified into a stereoscopic type display using glasses and an auto stereoscopic type display without glasses. Generally, the 3D image display apparatus of the auto stereoscopic type has been widely used without the glasses.

The 3D image display apparatus of the auto stereoscopic type may display the 3D image by refracting lights which pass through a right pixel and a left pixel of the 3D image display apparatus. Thus, luminance of the 3D image display apparatus may be increased.

However, a two-dimensional image signal is widely used as a source image signal in a display apparatus. Thus, a display apparatus is desired which is capable of displaying two-dimensional images or 3D images.

BRIEF SUMMARY OF THE INVENTION

One or more exemplary embodiments of the invention provide a liquid crystal lens panel having improved reliability and optical characteristics.

One or more exemplary embodiments of the invention also provide a method of manufacturing the above-mentioned liquid crystal lens panel.

According to an exemplary embodiment of the invention, the liquid crystal lens panel includes a plurality of lens electrodes, an alignment layer, a sealant and a light blocking pattern. The lens electrodes are arranged in an active region. The alignment layer is disposed in an alignment region which overlaps an entire of the active region and extends further than the active region. The sealant is disposed in a seal line region which is outside of the alignment region. The light blocking pattern is disposed in a light blocking region between the seal line region and the alignment region.

In an exemplary embodiment of the invention, the liquid crystal lens panel may further include a first lens substrate, a second lens substrate and a plurality of column spacers. The first lens substrate may include a common electrode. The second lens substrate may correspond to the first lens substrate. The second lens substrate may include the lens electrodes. The column spacers may maintain a cell gap between the first and second lens substrates.

In an exemplary embodiment of the invention, the first lens substrate may include the column spacers.

In an exemplary embodiment of the invention, the liquid crystal lens panel may include a peripheral area which surrounds the active area. The column spacers may include a plurality of first column spacers and a plurality of second column spacers. The first column spacers may be disposed in the active region. The second column spacers may be disposed in a portion of the alignment region which overlaps the peripheral region.

In an exemplary embodiment of the invention, the first column spacers may respectively overlap a portion of the lens electrodes which have a size greater than the first column spacers.

In an exemplary embodiment of the invention, the light blocking pattern may include opaque metal.

In an exemplary embodiment of the invention, the first lens substrate may include the light blocking pattern.

In an exemplary embodiment of the invention, the second lens substrate may include the light blocking pattern.

In an exemplary embodiment of the invention, the column spacers may further include a plurality of third column spacers disposed in the light blocking region.

In an exemplary embodiment of the invention, each of the third column spacers may have a size greater than the first and second column spacers.

In an exemplary embodiment of the invention, the third column spacers may be arranged in a density greater than the first and second column spacers.

In an exemplary embodiment of the invention, the light blocking pattern may include opaque organic material.

In an exemplary embodiment of the invention, a height of the light blocking pattern may correspond to a cell gap between the first and second lens substrates.

According to another exemplary embodiment of the invention, a method of manufacturing a liquid crystal lens panel is provided as follows. A first lens substrate including a first base substrate, an alignment layer and a light blocking pattern, is formed. The first base substrate includes an active region, an alignment region which overlaps an entire of the active region and extends further than the active region, a seal line region which is outside the alignment region, and a light blocking region which is between the seal line region and the alignment region. The alignment layer is formed in the alignment region of the first base substrate. The light blocking pattern is formed in the light blocking region of the first base substrate. A sealant is formed in the seal line region of the first base substrate. The first lens substrate is combined with a second lens substrate including a second base substrate. The second base substrate corresponds to the first base substrate. A light is irradiated into the first lens substrate and the light blocking pattern on the first base substrate, to solidify the sealant.

In an exemplary embodiment of the invention, the method may further include forming a plurality of lens electrodes on the second base substrate, and forming a plurality of column spacers on the first base substrate. The column spacers may maintain a cell gap between the first and second lens substrates.

In an exemplary embodiment of the invention, the forming the column spacers includes forming first column spacers in the active region and respectively overlapping a portion of the lens electrodes which have a size greater than the first column spacers, and forming third column spacers in the light blocking region, the third column spacers having a size greater than the first column spacers, and arranged in a density greater than the first column spacers.

In an exemplary embodiment of the invention, the method may further include forming a plurality of lens electrodes on the first base substrate, and forming a plurality of column spacers on the second base substrate. The column spacers may maintain a cell gap between the first and second lens substrates.

In an exemplary embodiment of the invention, the forming the column spacers includes forming first column spacers in the active region and respectively overlapping a portion of the lens electrodes which have a size greater than the first column spacers, and forming third column spacers in the light blocking region, the third column spacers having a size greater than the first column spacers, and arranged in a density greater than the first column spacers.

In an exemplary embodiment of the invention, the light blocking pattern may include opaque metal.

In an exemplary embodiment of the invention, the light blocking pattern may include opaque organic material.

According to one or more embodiments of the invention, in a liquid crystal lens panel, a light blocking pattern is disposed in a seal line region, and a peripheral region adjacent to the seal line region, to reduce or effectively prevent deterioration of liquid crystals during solidifying a sealant in the seal line region. The seal line region, the peripheral region and a peripheral region are defined on a substrate. Also, in a unit lens of the liquid crystal lens panel, a column spacer is disposed overlapping a lens electrode having greater width than the column spacer so that arrangement of the liquid crystals adjacent to the lens electrode may not be changed and luminance uniformity of the liquid crystals may not be deteriorated. In addition, size and/or density of column spacers disposed in the peripheral region are increased thereby improving cell gap uniformity of a liquid crystal layer.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "over," "under" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "over" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 1:
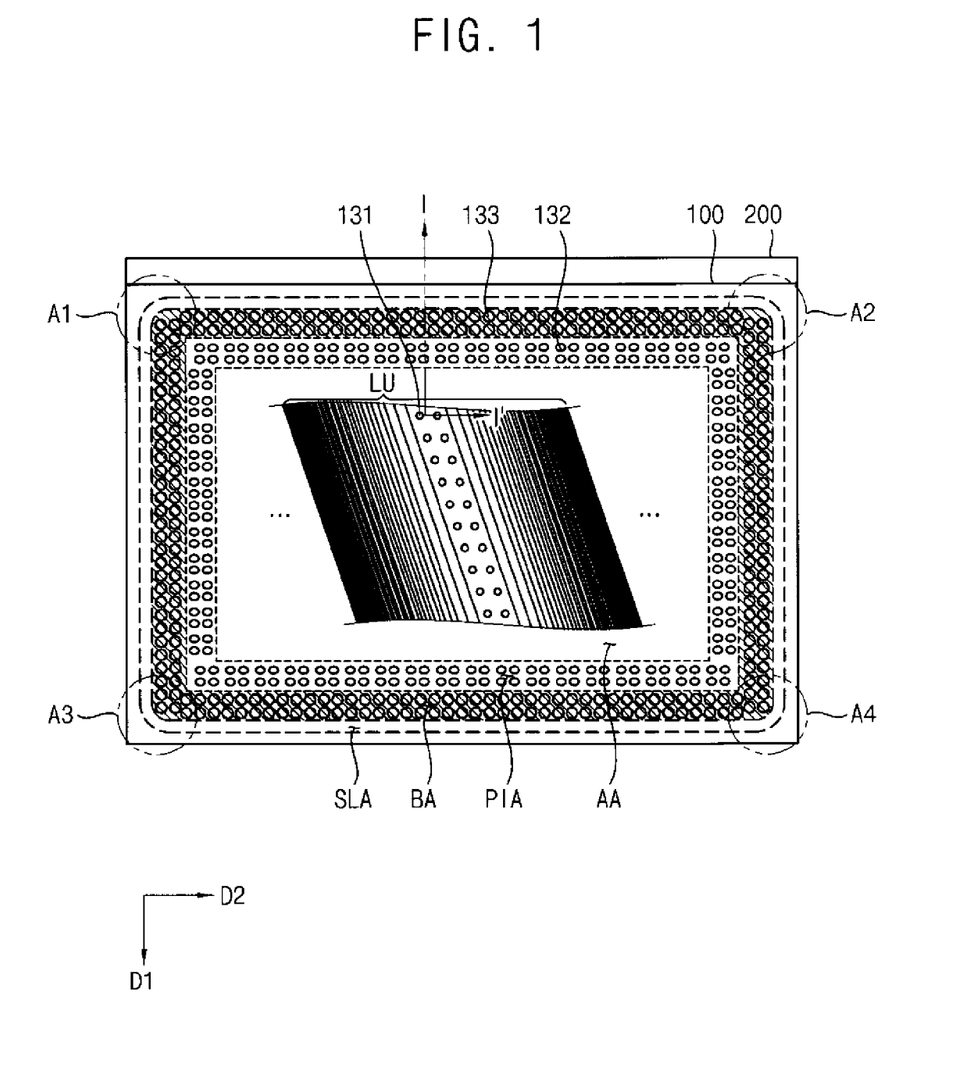
FIG. 1 is a plan view illustrating an exemplary embodiment of a liquid crystal lens panel according to the invention.
Figure 2:
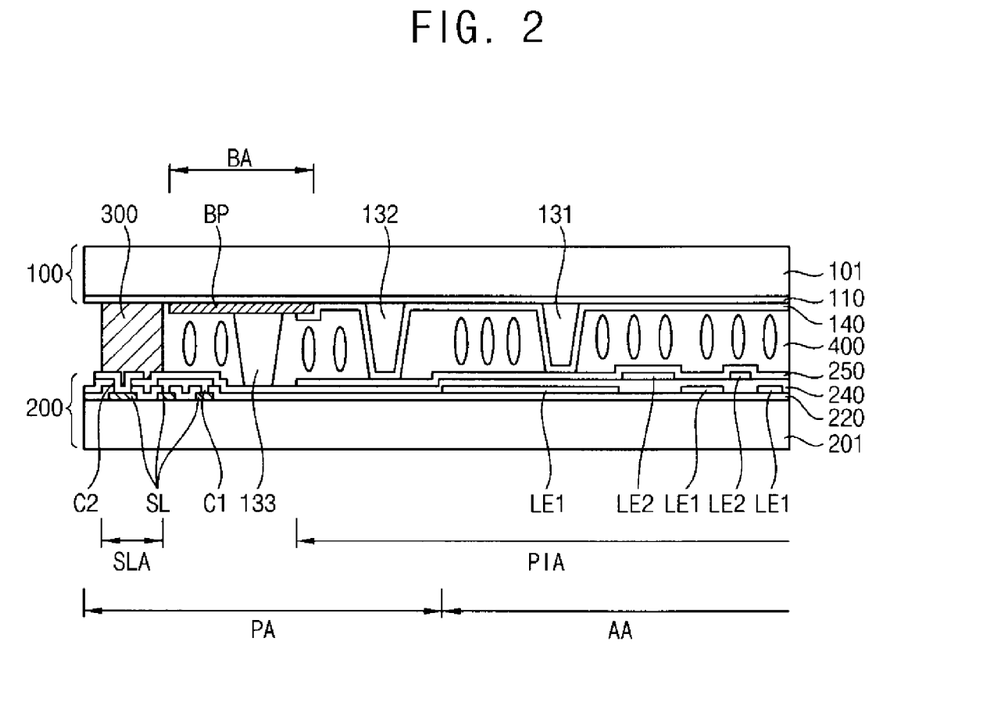
FIG. 2 is a cross-sectional view of the liquid crystal lens panel taken along line I-I' of FIG. 1.

FIG. 1 is a plan view illustrating an exemplary embodiment of a liquid crystal lens panel according to the invention. FIG. 2 is a cross-sectional view of the liquid crystal lens panel taken along line I-I' of FIG. 1.

Referring to FIGS. 1 and 2, the liquid crystal lens panel includes a first lens substrate 100, a second lens substrate 200, a sealant 300 and a liquid crystal layer 400.

The liquid crystal lens panel includes an active display region AA, a peripheral region PA, an alignment region PIA and a seal line region SLA. A plurality of unit lenses LU is in the active region AA. The peripheral region PA surrounds the active region AA in the plan view. An alignment layer is in the alignment region PIA. The sealant 300 is in the seal line region SLA. The alignment region PIA overlaps with the active region AA and a portion of the peripheral region PA directly adjacent to the active region AA. The seal line region SLA is disposed outside of the alignment region PIA.

The first lens substrate 100 includes a first base substrate 101, a common electrode 110, a light blocking pattern BP, a plurality of column spacers 131, 132 and 133, and a first alignment layer 140.

The common electrode 110 is disposed directly on the first base substrate 101. The common electrode 110 may be disposed on an entire area of the first base substrate 101.

The light blocking pattern BP is disposed in the peripheral region PA and adjacent to the seal line region SLA. The light blocking region BA may be defined by the light blocking pattern BP, for example, may have boundaries aligned with edges of the light blocking pattern BP. In one exemplary embodiment, for example, the light blocking pattern BP may be disposed on the common electrode 110 between the seal line region SLA and the alignment region PIA. An edge of the light blocking pattern BP may be overlapped with an edge of the first alignment layer 140 disposed in the alignment region PIA. The light blocking pattern BP may include opaque metal.

The light blocking pattern BP reduces or effectively prevents deterioration of liquid crystals of the liquid crystal layer 400 adjacent to the sealant 300, by light irradiated onto the sealant 300. The light may be irradiated onto the sealant 300 during a manufacturing process to solidify the sealant 300, in forming the liquid crystal lens panel.

The column spacers 131, 132 and 133 maintain a cell gap of the liquid crystal layer 400 which is interposed between the first and second lens substrates 100 and 200. The first column spacer 131 is disposed in the active region AA. The second column spacer 132 is disposed in a portion of the alignment region PIA overlapped with the peripheral region PA. The third column spacer 133 is disposed in the light blocking region BA defined by the light blocking pattern 120. While more than one of the column spacers 131, 132 and 133 may be indicated along line I-I' of FIG. 1, only one of the column spacers 131, 132 and 133 is illustrated in FIG. 2 for convenience.

The column spacers 131, 132 and 133 may further include a plurality of the first column spacers 131, a plurality of the second column spacers 132 and a plurality of third column spacers 133. Each of the first to third column spacers 131, 132 and 133 has a height taken perpendicular to the first base substrate 101 corresponding to the cell gap, such that the cell gap is maintained by the plurality of column spacers 131, 132 and 133. The third column spacers 133 may have greater size and/or density in the light blocking region BA than the first column spacers 131 in the active region AA. Also, the third column spacers 133 may have greater or substantially the same size and/or density in the light blocking region BA as the second column spacers 132 in the portion of the alignment region PIA overlapped with the peripheral region PA. In the exemplary embodiment, the size of the column spacer may be a cross-sectional size of the column spacer. Also, the light blocking region BA may have a frame shape in the plan view, and a portion of the third column spacers 133 adjacent to four corners A1, A2, A3 and A4 of the light blocking region BA may have greater size and/or density than the third column spacers 133 in a remainder of the light blocking region BA. Thus, the size and/or density of the third column spacers 133 in the light blocking region BA may be increased, thereby maintaining uniformity of the cell gap and reducing or effectively preventing defects of the liquid crystal lens panel caused by a non-uniform cell gap.

The first alignment layer 140 and the first to third column spacers 131, 132 and 133 are disposed on a same side of the first base substrate 101. A peripheral portion of the first alignment layer 140 may be overlapped with the light blocking pattern BP.

The second lens substrate 200 includes a second base substrate 201, a plurality of signal lines SL, a first insulating layer 220, a plurality of first lens electrodes LE1, a second insulating layer 240, a plurality of second lens electrodes LE2 and a second alignment layer 250.

The second base substrate 201 corresponds to the first base substrate 101. That is, the second base substrate 201 faces the first base substrate 101.

The signal lines SL are in the peripheral region PA. The signal lines SL transmit driving signals that are applied to the first and second lens electrodes LE1 and LE2.

The first insulating layer 220 is on the second base substrate 201 such that the signal lines SL are between the first insulating layer 220 and the second base substrate 201. The first insulating layer 220 includes a first contact hole C1 through which the signal lines SL are partially exposed.

The first lens electrodes LE1 have longitudinal (major) axes which are extended in a first direction D1 and are on the first insulating layer 220. The first lens electrodes LE1 have transverse (minor) axes which are perpendicular to the longitudinal axes. The first lens electrodes LE1 are arranged in a second direction D2 crossing the first direction D1. The longitudinal axes of first lens electrodes LE1 may be inclined with respect to the first direction D1. Each of the first lens electrodes LE1 of a unit lens LU may have a symmetrical shape, and may have a uniform width with respect to a central line parallel to the longitudinal axis of the first lens electrode LE1.

A width of the first lens electrode LE1 is taken perpendicular to the longitudinal axis of the first lens electrode LE1. In one exemplary embodiment, for example, a width of the first lens electrode LE1 in a central region of the unit lens LU may be greater than a width of the first lens electrode LE1 in a peripheral region excluding the central region, of the unit lens LU. The widths of the first lens electrodes LE1 may gradually decrease in a direction from the central region to the peripheral region of the unit lens LU.

The second insulating layer 240 is on the second base substrate 201 such that the first lens electrodes LE1 are between the second insulating layer 240 and the first insulating layer 220. The second insulating layer 240 includes a second contact hole C2 partially exposing the signal lines SL.

The second lens electrodes LE2 have longitudinal (major) axis which are extended in the first direction D1 and are on the second insulating layer 240. The second lens electrodes LE2 have transverse (minor) axes which are perpendicular to the longitudinal axes. The second lens electrodes LE2 are alternately arranged with the first lens electrodes LE1. The longitudinal axes of the second lens electrodes LE2 may be inclined with respect to the first direction D1. The second lens electrodes LE2 are arranged in the second direction D2 that crosses the first direction D1. Each of the second lens electrodes LE2 of the unit lens LU may have a symmetrical shape, and may have a uniform width with respect to a central line parallel to the longitudinal axis of the second lens electrode LE2.

A width of the second lens electrode LE2 is taken perpendicular to the longitudinal axis of the second lens electrode LE2. In one exemplary embodiment, for example, a width of the second lens electrode LE2 in the central region of the unit lens LU may be greater than a width of the second lens electrode LE2 in the peripheral region excluding the central region, of the unit lens LU. The widths of the second lens electrodes LE2 may gradually decrease in a direction from the central region to the peripheral region of the unit lens LU.

The first column spacers 131 in the active region AA overlap the first and/or second lens electrodes LE1 and/or LE2. Each of the first and second lens electrodes LE1 and LE2 may have greater width than each of the first column spacers 131 respectively overlapped thereby. An entire of the first column spacers 131 may be disposed on the first and second lens electrodes LE1 and LE2. When a column spacer has a greater size than a lens electrode, arrangement of the liquid crystals of the liquid crystal layer 400 may be disturbed, thereby luminance uniformity of the liquid crystals may be deteriorated.

In the exemplary embodiment, the first and second lens electrodes LE1 and LE2 have greater size than the first column spacers 131, and are disposed overlapping the first column spacers 131. Thus, optical characteristics and light efficiency of the liquid crystals in the liquid crystal layer 400 may be improved, and liquid crystals adjacent the first and second lens electrodes LE1 and LE2 may properly function as lenses.

The second alignment layer 250 may be on the second base substrate 201 such that the second lens electrodes LE2 are between second alignment layer 250 and the second insulating layer 240.

The sealant 300 is disposed in the peripheral region PA between the first and second lens substrates 100 and 200, and combines the first lens substrate 100 with the second lens substrate 200.

The liquid crystal layer 400 is interposed between the first and second lens substrates 100 and 200 that are combined with each other by the sealant 300. The liquid crystal layer 400 may include more than about 60% of Tolane-based material that has high refractivity of more than about 0.2 (n>0.2).

Figure 3A:
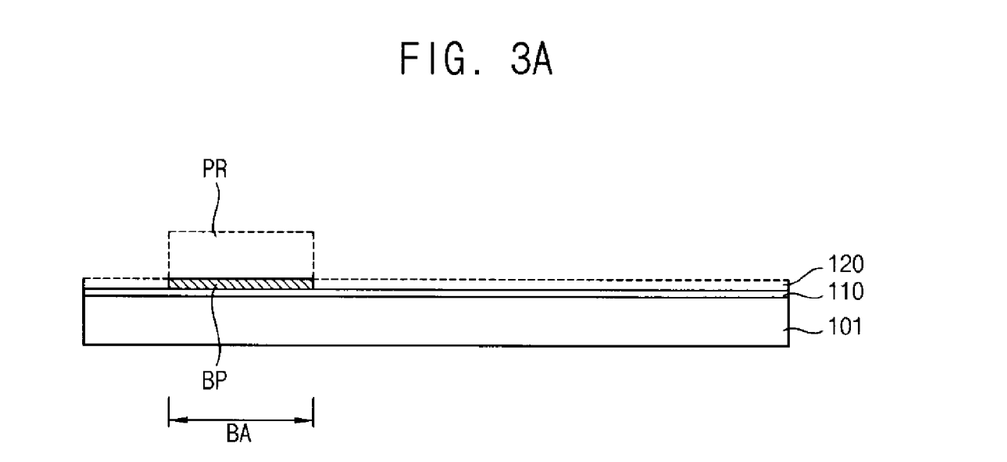
FIGS. 3A to 3C are cross-sectional views illustrating an exemplary embodiment of a method of manufacturing a first lens substrate shown in FIG. 2.
Figure 3B:
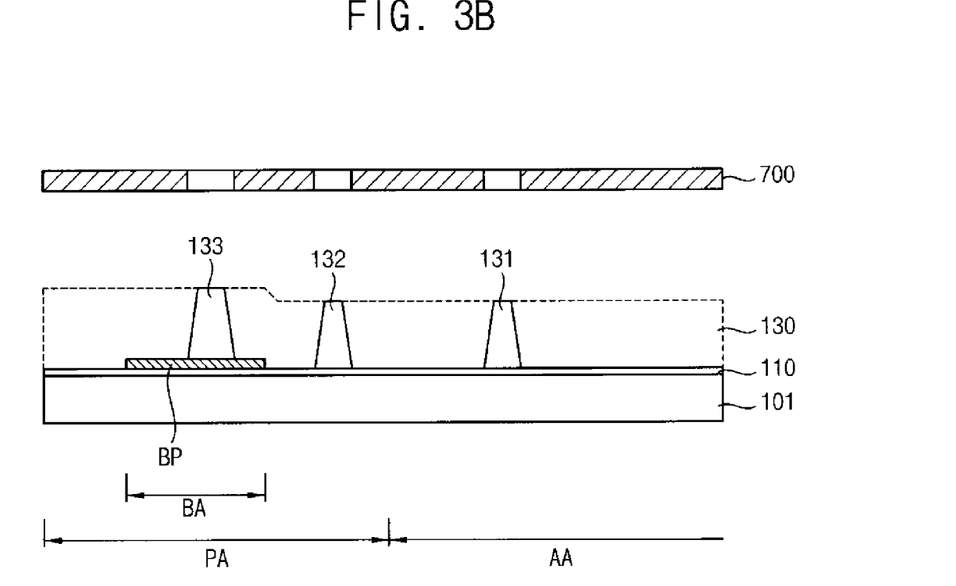
Figure 3C:
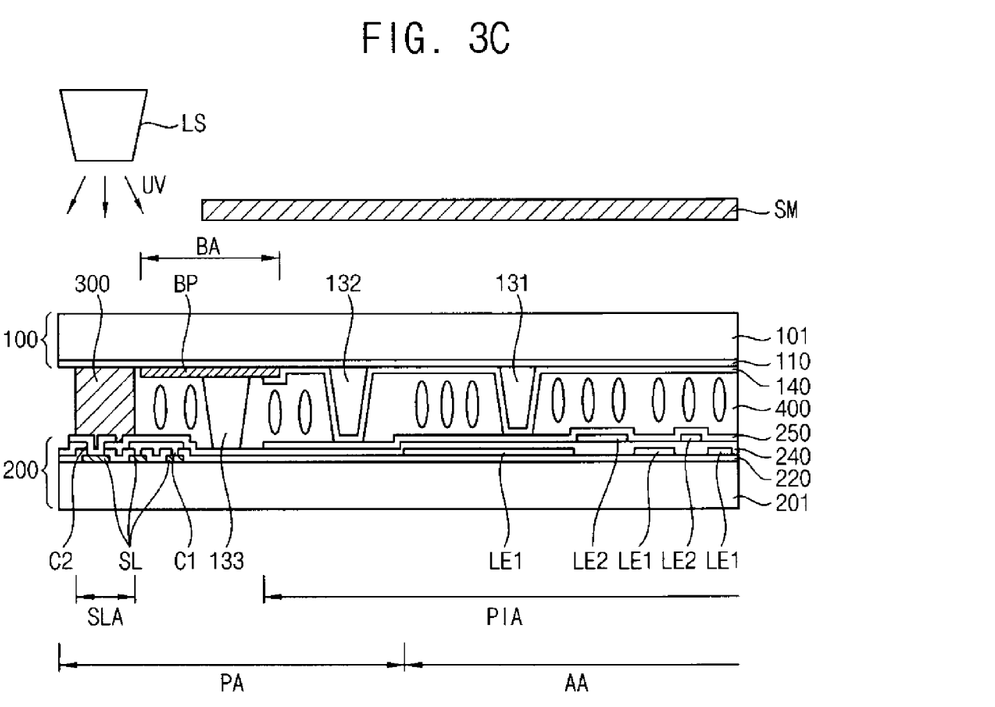

FIGS. 3A to 3C are cross-sectional views illustrating an exemplary embodiment of a method of manufacturing a first lens substrate shown in FIG. 2.

Referring to FIGS. 1 and 3A, a common electrode 110 is formed directly on a first base substrate 101. The common electrode 110 may include a transparent conductive material.

An opaque metal layer 120 is formed on the first base substrate 101 including the common electrode 110. A photo pattern PR is formed on the first base substrate 101 including the opaque metal layer 120. The photo pattern PR is formed between the alignment region PIA and the seal line region SLA. The opaque metal layer 120 is patterned using the photo pattern PR to remove portions of the opaque metal layer 120 and form a light blocking pattern BP. A light blocking region BA is defined by the light blocking pattern BP. The light blocking region BA may have a frame shape in a plan view of the first base substrate 101.

Referring to FIGS. 1 and 3B, an organic layer 130 is formed on the first base substrate 101 including the light blocking pattern BP. The organic layer 130 may have a thickness taken perpendicular to the first base substrate 101 corresponding to a cell gap of the unit lens LU. The organic layer 130 is patterned using a mask 700 to remove portions of the pattern layer 130 and form a plurality of first column spacers 131, a plurality of second column spacers 132 and a plurality of third column spacers 133. The first column spacers 131 are formed in an active region AA. The second column spacers 132 are formed in a portion of an alignment region PIA overlapping with a peripheral region PA. The third column spacers 133 are formed in the light blocking region BA between the seal line region SLA and the alignment region PIA. The light blocking pattern BP is formed in the light blocking region BA.

The first column spacers 131 are disposed overlapping the lens electrodes of the second lens substrate 200. The lens electrodes of the second lens substrate 200 may have greater size than the first column spacers 131 of the first lens substrate 100. The second and third column spacers 132 and 133 may have substantially the same height as the first column spacers 131. The third column spacers 133 may have greater size than the first and second column spacers 131 and 132. The third column spacers 133 may have greater density than the second column spacers 132.

Also, the light blocking region BA may have a frame shape in the plan view of the first base substrate 101, and a portion of the third column spacers 133 adjacent to four corners A1, A2, A3 and A4 of the light blocking region BA may have greater size and/or density than the third column spacers 133 in a remainder of the light blocking region BA. Thus, the size and/or density of the third column spacers 133 in the light blocking region BA may be increased, thereby maintaining uniformity of the cell gap and reducing or effectively preventing defects of the liquid crystal lens panel caused by a non-uniform cell gap.

Referring to FIGS. 1 and 3C, a first alignment layer 140 is formed on the first base substrate 101 including the first, second and third column spacers 131, 132 and 133, thereby completing the first lens substrate 100.

A liquid crystal layer 400 is formed on the second lens substrate 200. A sealant 300 is formed in a seal line region SLA of the second lens substrate 200 including the liquid crystal layer 400.

The first lens substrate 100 is combined with the second lens substrate 200 including the liquid crystal layer 400 and the sealant 300, thereby completing a liquid crystal lens panel.

A shadow mask SM is arranged over the first lens substrate 100 of the liquid crystal lens panel. The shadow mask SM may include an open portion in a region corresponding to the seal line region SLA. The open portion is spaced apart from an edge of the seal line region SLA by a constant distance. Ultraviolet light UV generated from a light source LS is selectively irradiated onto the seal line region SLA of the first lens substrate 100 through the shadow mask SM. Thus, the sealant 300 is solidified.

The ultraviolet light UV corresponding to the liquid crystal layer 400 is blocked by the shadow mask SM, for example, in the active region AA. However, the open portion of the shadow mask SM has a marginal region corresponding to the seal line region SLA. Although the shadow mask SM may be incorrectly aligned by the margin or deviation of arrangement, the light blocking pattern BP reduces or effectively prevents the irradiation of the ultraviolet light UV toward an inside of the liquid crystal lens panel, such as toward the alignment region PIA and/or the active region AA.

Figure 4:
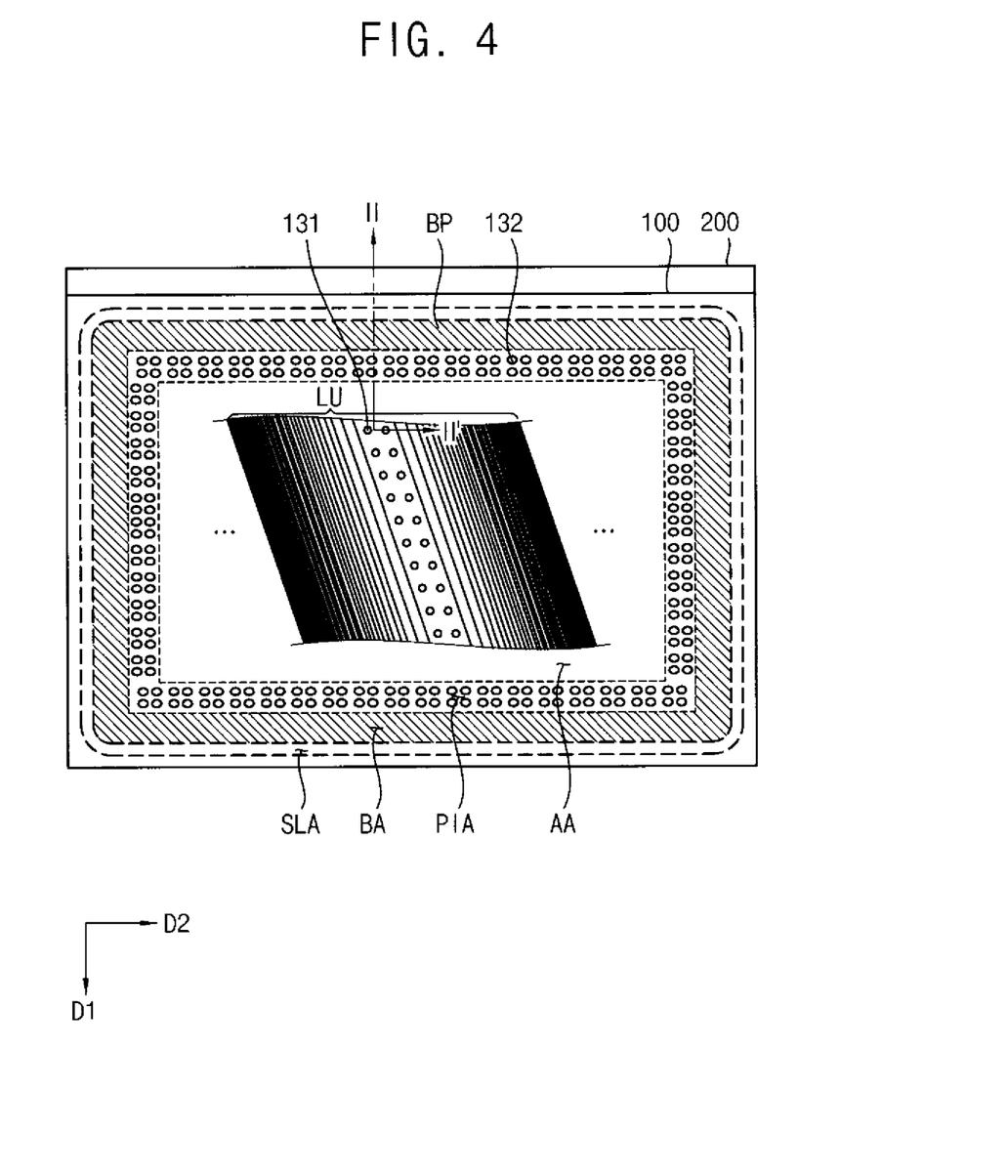
FIG. 4 is a plan view illustrating another exemplary embodiment of a liquid crystal lens panel according to the invention.
Figure 5:
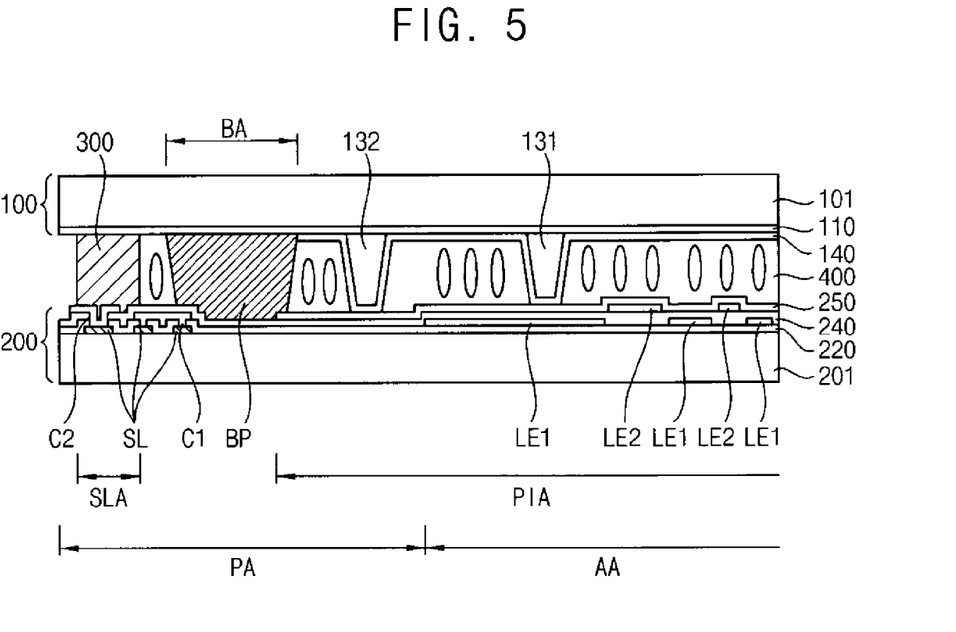
FIG. 5 is a cross-sectional view of the liquid crystal lens panel taken along line II-II' of FIG. 4.

FIG. 4 is a plan view illustrating another exemplary embodiment of a liquid crystal lens panel according to the invention. FIG. 5 is a cross-sectional view illustrating line II-II' of FIG. 4.

Hereinafter, same reference numerals will be used for the same elements. Thus, any repetitive descriptions will be omitted.

A first lens substrate 100 includes a first base substrate 101, a common electrode 110, a light blocking pattern BP, a plurality of column spacers 131 and 132, and a first alignment layer 140. The second lens substrate 200 includes a second base substrate 201, a plurality of signal lines SL, a first insulating layer 220, a plurality of first lens electrodes LE1, a second insulating layer 240, a plurality of second lens electrodes LE2 and a second alignment layer 250.

A liquid crystal lens panel shown in FIGS. 4 and 5 is substantially the same as the liquid crystal lens panel illustrated in FIGS. 1 and 2 except for a light blocking pattern. Thus, the liquid crystal lens panel including the light blocking pattern will be illustrated referring to FIGS. 4 and 5 and any repetitive descriptions will be omitted.

The light blocking pattern BP includes an opaque organic material, and has a thickness corresponding to a cell gap. Thus, the light blocking pattern BP has substantially the same function as the third column spacers 133 of the liquid crystal lens panel shown in FIGS. 1 and 2, and separate third column spacers are therefore not necessary. The light blocking pattern BP in the light blocking region BA maintains cell gap uniformity, thereby reducing or effectively preventing deterioration of the cell gap in a peripheral region PA of the liquid crystal lens panel.

The light blocking pattern BP is disposed in the peripheral region PA between the seal line SLA and the alignment region PIA to define a light blocking region BA. Thus, in a method of manufacturing the liquid crystal lens panel shown in FIGS. 4 and 5, the light blocking pattern BP reduces or effectively prevents the irradiation of the ultraviolet light toward inside of the liquid crystal lens panel, thereby reducing or effectively preventing deterioration of liquid crystals adjacent to the sealant 300.

Figure 6A:
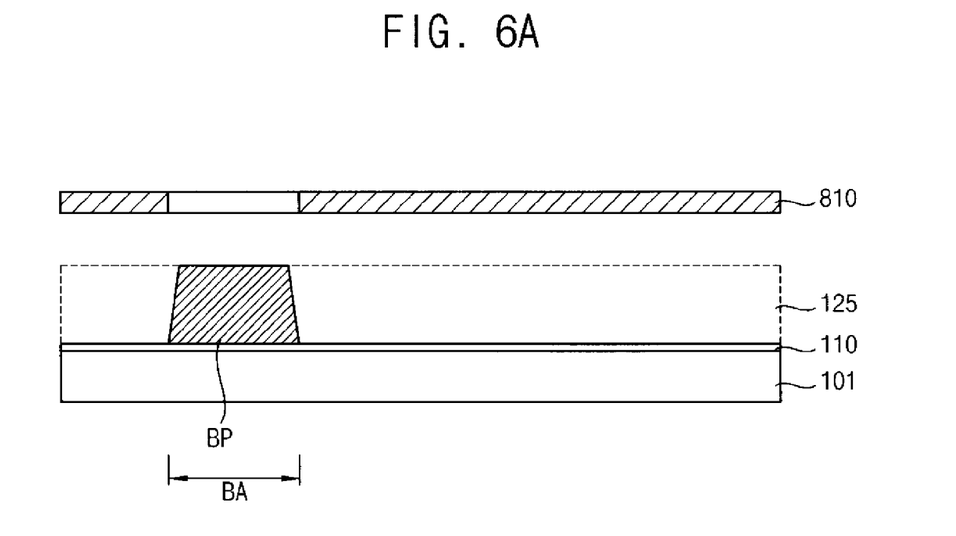
FIGS. 6A to 6C are cross-sectional views illustrating an exemplary embodiment of a method of manufacturing a first lens substrate shown in FIG. 5.
Figure 6B:
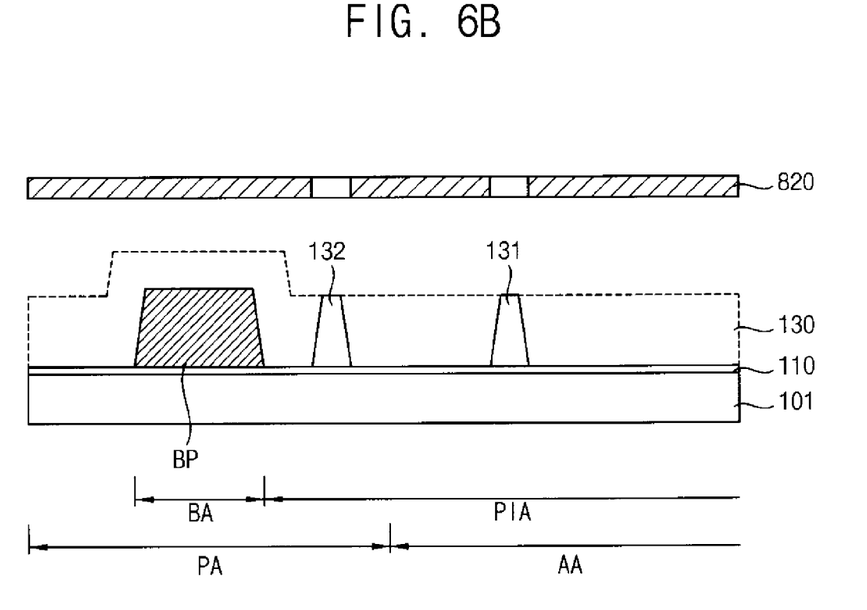
Figure 6C:
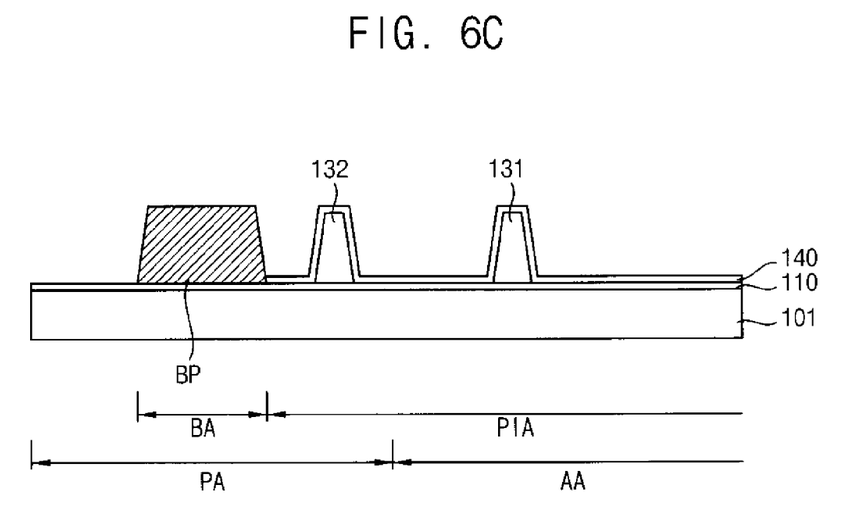

FIGS. 6A to 6C are cross-sectional views illustrating an exemplary embodiment of manufacturing a first lens substrate shown in FIG. 5.

Referring to FIGS. 5 and 6A, a common electrode 110 is formed directly on the first base substrate 101. The common electrode 110 may include a transparent conductive material.

An opaque organic layer 125 is formed on the first base substrate 101 including the common electrode 110. The opaque organic layer 125 is patterned to form the light blocking pattern BP. The opaque organic layer 125 may be patterned using a first mask 810, where an open region corresponds to the light blocking pattern BP. The light blocking pattern BP is formed in the peripheral region PA between the alignment region PIA and the seal line region SLA. The light blocking region BA is defined by the light blocking pattern BP.

The light blocking pattern BP may have a thickness (e.g., a height) corresponding to a cell gap between the first and second base substrates 101 and 102. In one exemplary embodiment, for example, the height of the light blocking pattern BP may be about 1.5 micrometers (µm) to about 2 µm. The light blocking pattern BP may function as a column spacer in the light blocking region BA.

Referring to FIGS. 1 and 6B, an organic layer 130 is formed on the first base substrate 101 including the light blocking pattern BP. The organic layer 130 may have a thickness taken perpendicular to the base substrate 101 corresponding to a cell gap of the unit lens LU. The organic layer 130 is patterned using a second mask 820 to form a plurality of first column spacers 131 and a plurality of second column spacers 132. The first column spacers 131 are formed in an active region AA. The second column spacers 132 are formed in a portion of an alignment region PIA overlapping with a peripheral region PA.

The first column spacers 131 are disposed overlapping the lens electrodes of the second lens substrate 200. The lens electrodes of the second lens substrate 200 may have greater size than the first column spacers 131 of the first lens substrate 100. The first and second column spacers 131 and 132 may have substantially the same height (or thickness) as the light blocking pattern BP. The second column spacers 132 in the portion of the alignment region PIA overlapping with the peripheral region PA may have greater size and/or density than the first column spacers 131 in the active region AA. Thus, non-uniformity of a cell gap in the peripheral region of the liquid crystal lens panel may be reduce or effectively prevented.

Alternatively, the structure of the second mask 820 for forming the first and second column spacers 131 and 132 may also be used in the first mask 810. That is, a single integrated first mask 810 may further include a transmission or open portion corresponding to the first and second column spacers 131 and 132. Thus, the organic layer 130 may be patterned using the first mask 810 to form the first and second column spacers 131 and 132, as well as using the first mask 810 to pattern the opaque organic layer 125 to form the light blocking pattern BP.

Referring to FIGS. 1 and 6C, a first alignment layer 140 is formed on the first base substrate 101 including the light blocking pattern BP and the first and second column spacers 131 and 132. The first alignment layer 140 is formed in the alignment region PIA to complete the first lens substrate 100.

A liquid crystal layer 400 is formed on the second lens substrate 200. A sealant 300 is formed in a seal line region SLA of the second lens substrate 200 including the liquid crystal layer 400. The first lens substrate 100 is arranged on the second lens substrate 200 including the liquid crystal layer 400 and the sealant 300.

A shadow mask SM (shown in FIG. 3C) is arranged over the first lens substrate 100 including the light blocking pattern BP. Ultraviolet light UV generated from a light source LS is selectively irradiated onto the seal line region SLA of the first lens substrate 100 through the shadow mask SM. The seal line region SLA is exposed by the shadow mask SM. Thus, the sealant 300 is solidified. The ultraviolet light UV is irradiated onto the liquid crystal lens panel through the first lens substrate 100.

The ultraviolet light UV corresponding to the liquid crystal layer 400 is blocked by the shadow mask SM. However, the open portion of the shadow mask SM has a marginal region corresponding to the seal line region SLA. Although the shadow mask SM may be incorrectly aligned by the margin or deviation of arrangement, the light blocking pattern BP reduces or effectively prevents the irradiation of the ultraviolet light UV toward an inside of the liquid crystal lens panel.

Thus, since the liquid crystals in the liquid crystal lens may be protected from the ultraviolet light, optical characteristics of lenses formed by the liquid crystals may not be deteriorated.

Figure 7:
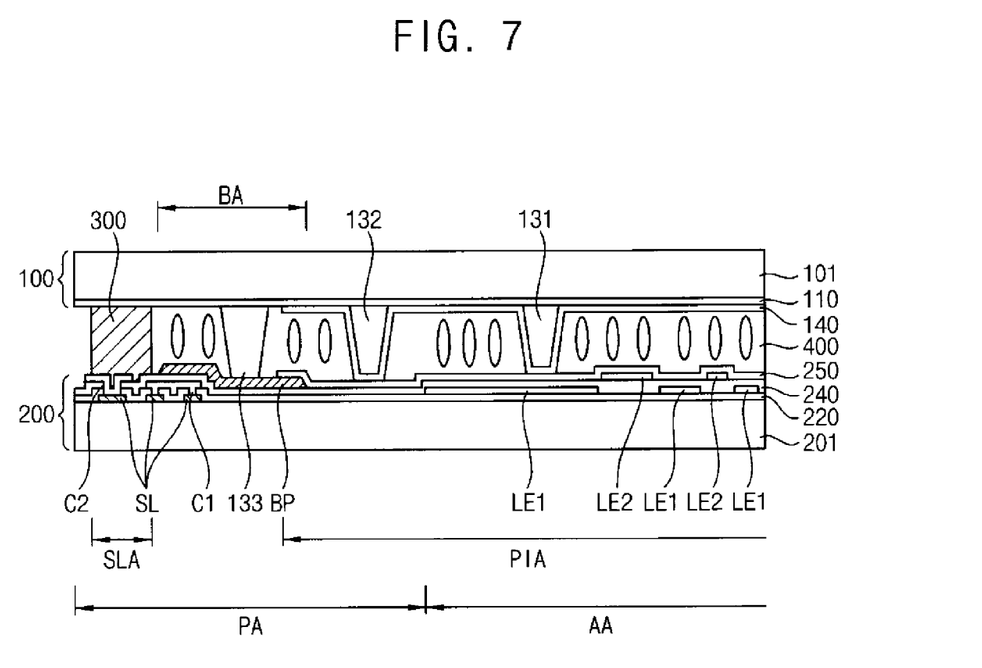
FIG. 7 is a cross-sectional view illustrating still another exemplary embodiment of a liquid crystal lens panel according to the invention.

FIG. 7 is a cross-sectional view illustrating still another exemplary embodiment of a liquid crystal lens panel according to the invention.

A liquid crystal lens panel shown in FIG. 7 is substantially the same as the liquid crystal lens panel illustrated in FIGS. 1 and 2 except for a light blocking pattern. Thus, the liquid crystal lens panel including the light blocking pattern will be illustrated referring to FIG. 7 and any repetitive descriptions will be omitted.

The liquid crystal lens panel includes a first lens substrate 100, a second lens substrate 200, a sealant 300 and a liquid crystal layer 400.

The first lens substrate 100 includes a first base substrate 101, a common electrode 110, a plurality of column spacers 131, 132 and 133 and a first alignment layer 140.

The second lens substrate 200 includes a second base substrate 201, a plurality of signal lines SL, a first insulating layer 220, a plurality of first lens electrodes LE1, a second insulating layer 240, a plurality of second lens electrodes LE2, a light blocking pattern BP and a second alignment layer 250.

The light blocking pattern BP of the second lens substrate 200 is disposed in a peripheral region PA and adjacent to the seal line region SLA to define a light blocking region BA. In one exemplary embodiment, for example, the light blocking pattern BP may be on the second insulating layer 240 between the seal line region SLA and the alignment region PIA. A first edge of the light blocking pattern BP may cover a portion of the signal lines in the peripheral region PA. Thus, the signal lines SL including metal and the light blocking pattern BP block light incident into an inside of the liquid crystal lens panel. A second edge opposite to the first edge of the light blocking pattern BP may be overlapped with an edge of the second alignment layer 250 disposed in the alignment region PIA. The light blocking pattern BP may include opaque metal.

FIGS. 8A to 8D are cross-sectional views illustrating an exemplary embodiment of a method of manufacturing a second lens substrate shown in FIG. 7.

Figure 8A:
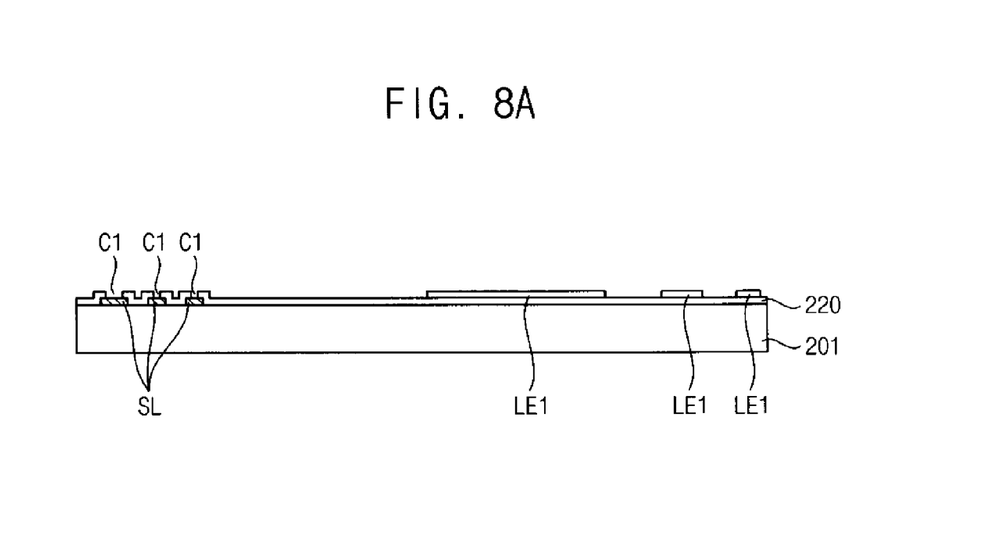
FIGS. 8A to 8D are cross-sectional views illustrating an exemplary embodiment of a method of manufacturing a second lens substrate of FIG. 7.

Referring to FIGS. 1, 7 and 8A, a metal layer is formed directly on a second base substrate 201. The metal layer is patterned to form the signal lines SL in the peripheral region PA. A first insulating layer 220 is formed on the second base substrate 201 including the signal lines SL. The second insulating layer 220 may be etched to form a first contact hole C1 exposing a portion of the signal lines SL.

A first transparent conductive layer may be formed on the first insulating layer 220. The first transparent conductive layer is patterned to form the first lens electrodes LE1. Also, the first transparent conductive layer may be patterned to form a first connection electrode CE1. The first connection electrode CE1 is electrically connected to another portion of the signal lines through the first contact hole C1.

Figure 8B:
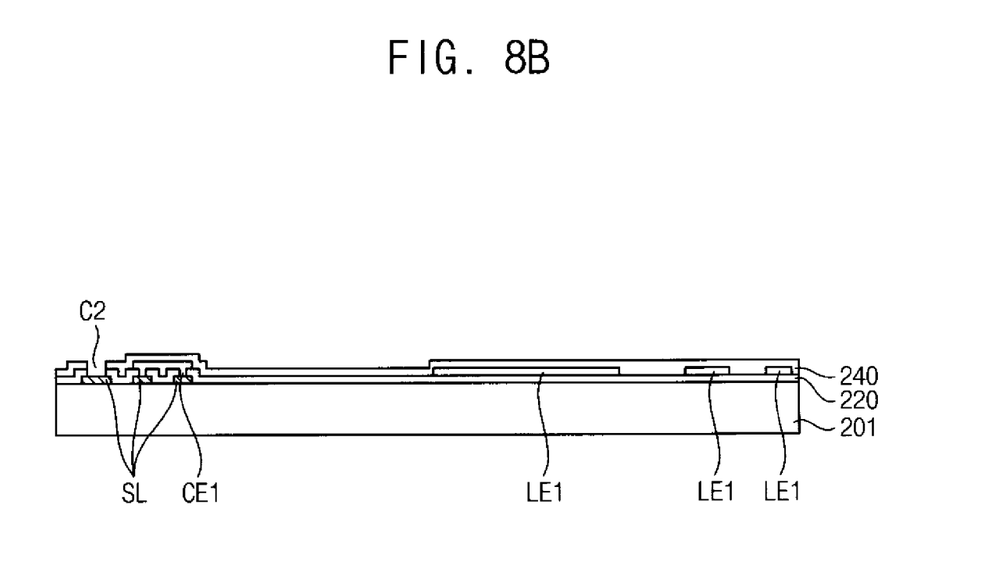

Referring to FIGS. 1, 7 and 8B, the first lens electrodes LE1 have longitudinal (major) axes which are extended in a first direction D1, and are arranged along a second direction D2 crossing the first direction D1. The first lens electrodes LE1 have transverse (minor) axes which are perpendicular to the longitudinal axes. The longitudinal axes of the first lens electrodes LE1 may be inclined with respect to the first direction D1. Each of the first lens electrodes LE1 of the unit lens LU may have a symmetrical shape, and may have a uniform width with respect to a central line parallel to the longitudinal axis of the first electrode LE1.

A width of the first lens electrode LE1 is taken perpendicular to the longitudinal axis of the first lens electrode LE1. In one exemplary embodiment, for example, a width of the first lens electrode LE1 in a central region of the unit lens LU may be greater than a width of the first lens electrode LE1 in a peripheral region of the unit lens LU. The widths of the first lens electrodes LE1 may gradually decrease in a direction from the central region to the peripheral region of the unit lens LU.

The second insulating layer 240 is formed on the second base substrate 201 including the first lens electrodes LE1. The second insulating layer 240 includes a second contact hole C2 partially exposing the signal lines SL.

Figure 8C:
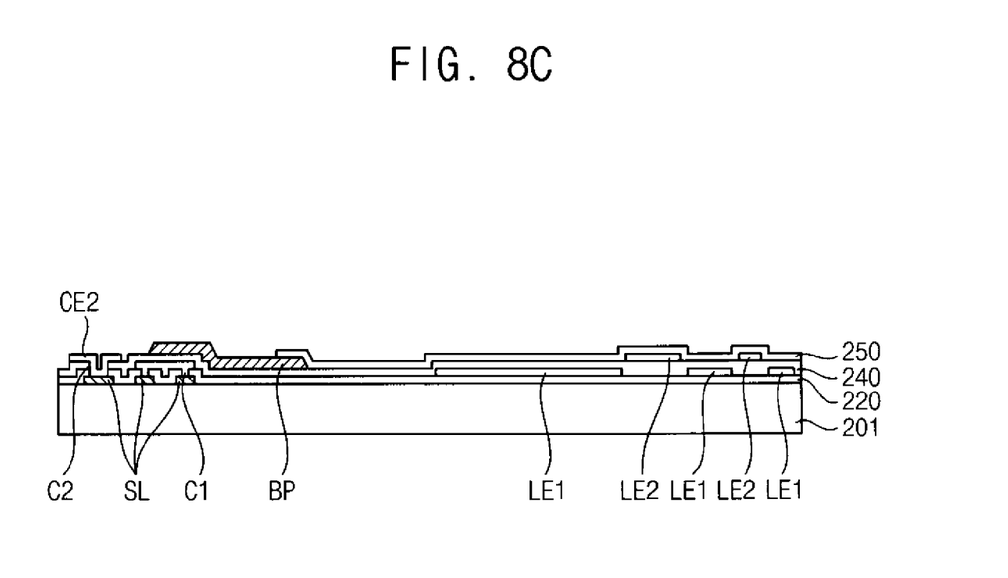

Referring to FIGS. 1, 7 and 8C, a second transparent conductive layer is formed on the second insulating layer 240. The second transparent conductive layer is patterned to form the second lens electrodes LE2. Also, a second connection electrode CE2 may be formed by patterning the second transparent conductive layer. The second connection electrode CE2 is electrically connected to a portion of the signal lines through the first and second contact holes C1 and C2.

The second lens electrodes LE2 have longitudinal (major) axis which are extended in the first direction D1 and are formed on the second insulating layer 240. The second lens electrodes LE2 have transverse (minor) axes which are perpendicular to the longitudinal axes. The second lens electrodes LE2 are alternately arranged with the first lens electrodes LE1. Each of the second lens electrodes LE2 of the unit lens LU may have a symmetrical shape, and may have a uniform width with respect to a central line parallel to the longitudinal axis of the second lens electrode LE2.

A width of the second lens electrode LE2 is taken perpendicular to the longitudinal axis of the second lens electrode LE2. In one exemplary embodiment, for example, a width of the second lens electrode LE2 in the central region of the unit lens LU may be greater than a width of the second lens electrode LE2 in the peripheral region of the unit lens LU. The widths of the second lens electrodes LE2 may gradually decrease in a direction from the central region to the peripheral region of the unit lens LU.

An opaque metal layer may be formed on the second base substrate 201 on which the second lens electrodes LE2 are formed. The opaque metal layer is patterned to form the light blocking pattern BP. The light blocking pattern BP may be formed on the second insulating layer 240 between the seal line region SLA and the alignment region PIA. A first edge of the light blocking pattern BP may partially cover the signal lines SL disposed in the peripheral region PA.

A second alignment layer 250 is formed on the second base substrate 201 including the light blocking pattern BP. The second alignment layer 250 is formed in the alignment region PIA. An edge of the second alignment layer 250 may be overlapped with a second edge opposing the first edge of the light blocking pattern BP.

Thus, the second lens substrate 200 is completed.

Figure 8D:
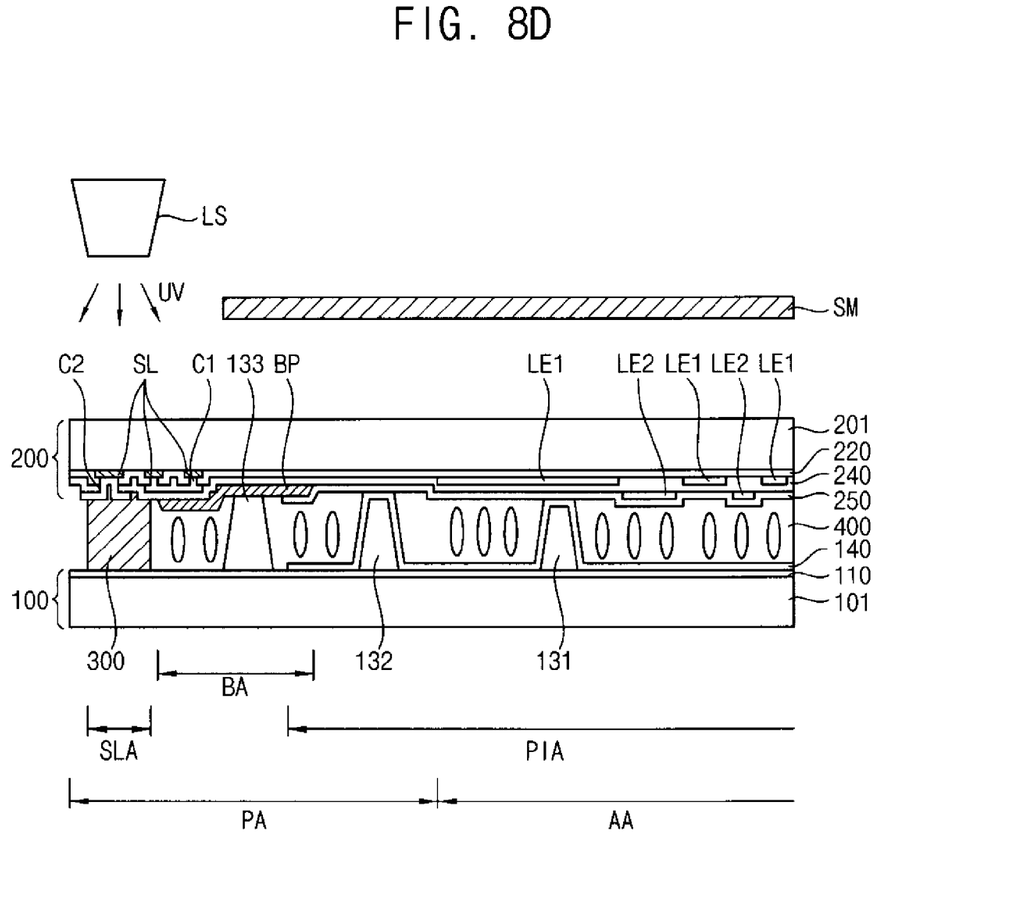

Referring to FIGS. 1, 7 and 8D, a liquid crystal layer 400 is formed on the first lens substrate 100. A sealant 300 is formed in the seal line region SLA of the first lens substrate 100 including the liquid crystal layer 400.

The second lens substrate 200 including the light blocking pattern BP is disposed on the first lens substrate 100 including the liquid crystal layer 400 and the sealant 300.

A shadow mask SM is arranged on the second lens substrate 200 including the light blocking pattern BP. The shadow mask SM exposes the seal line region SLA. Ultraviolet light UV generated from a light source LS is selectively irradiated onto the seal line region SLA of the second lens substrate 200 through the shadow mask SM. Thus, the sealant 300 is solidified.

The ultraviolet light UV may be irradiated onto the liquid crystal lens panel through the second lens substrate 200. The ultraviolet light UV corresponding to the liquid crystal layer 400 is blocked by the shadow mask SM. However, the open portion of the shadow mask SM has a marginal region corresponding to the seal line region SLA. Although the shadow mask SM may be incorrectly aligned by the margin or deviation of arrangement, the light blocking pattern BP reduced or effectively prevents the irradiation of the ultraviolet light UV toward an inside of the liquid crystal lens panel.

Thus, since the liquid crystals in the liquid crystal lens may be protected from the ultraviolet light, optical characteristics of lenses formed by the liquid crystals may not be deteriorated.

According to one or more exemplary embodiments of the invention, in a liquid crystal lens panel, the light blocking pattern is disposed in the peripheral region adjacent to the seal line, thereby reducing or effectively preventing deterioration of the liquid crystals during solidifying the sealant. Also, in a unit lens of the liquid crystal lens panel, the column spacer is disposed overlapping the lens electrode which has a greater size than the column spacer, so that the liquid crystals adjacent to the lens electrode may not be disturbed and luminance uniformity of the liquid crystals may not be deteriorated. In addition, the column spacers in the peripheral region have greater size and/or density than the column spacers in a central region, thereby improving uniformity of the cell gap of the liquid crystal lens panel.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A liquid crystal lens panel comprising:
   a first lens substrate comprising:
      a common electrode;
      an active region,
      an alignment region which overlaps an entire of the active region and extends further than the active region,
      a seal line region which is outside of the alignment region,
      a light blocking region which is between the seal line region and the alignment region, and
      a peripheral region which surrounds the active region;
   a second lens substrate which faces the first lens substrate and comprises a plurality of lens electrodes which is arranged in the active region;
   an alignment layer in the alignment region
   a sealant in the seal line region;
   a light blocking pattern in the light blocking region;
   liquid crystal in a cell gap between the first lens substrate and the second lens substrate, and in the active, alignment and light blocking regions; and
   a plurality of column spacers in the cell gap between the first lens substrate and the second lens substrate, wherein the plurality of columns spacers in the cell gap maintains the cell gap,
   wherein
   the plurality of column spacers in the cell gap comprises:
      a plurality of first column spacers in the active region, overlapping a portion of the plurality of lens electrodes, wherein the portion of the plurality of lens electrodes has a size greater than the plurality of first column spacers; and
      a plurality of second column spacers in a portion of the alignment region which overlaps the peripheral region.

2. The liquid crystal lens panel of claim 1, wherein the first lens substrate includes the plurality of column spacers.

3. The liquid crystal lens panel of claim 1, wherein the light blocking pattern comprises opaque metal.

4. The liquid crystal lens panel of claim 3, wherein the first lens substrate includes the light blocking pattern.

5. The liquid crystal lens panel of claim 3, wherein the second lens substrate includes the light blocking pattern.

6. The liquid crystal lens panel of claim 3, wherein the plurality of column spacers further comprises a plurality of third column spacers in the light blocking region.

7. The liquid crystal lens panel of claim 6, wherein each of the plurality of third column spacers has a size greater than the plurality of first column spacers and the plurality of second column spacers.

8. The liquid crystal lens panel of claim 6, wherein the plurality of third column spacers are arranged in a density greater than the plurality of first column spacers and the plurality of second column spacers.

9. The liquid crystal lens panel of claim 1, wherein the light blocking pattern comprises opaque organic material.

10. The liquid crystal lens panel of claim 9, wherein a thickness of the light blocking pattern extends into the cell gap between the first lens substrate and the second lens substrate.

11. The liquid crystal lens panel of claim 1, wherein the light blocking pattern overlaps the liquid crystal in a portion of the light blocking region at which the alignment layer is not disposed, in a plan view.

12. A method of manufacturing a liquid crystal lens panel, the method comprising:
   forming a first lens substrate including a first base substrate, an alignment layer, a light blocking pattern and a common electrode,
      the first base substrate comprising an active region, an alignment region which overlaps an entire of the active region and extends further than the active region, a seal line region which is outside the alignment region, a light blocking region between the seal line region and the alignment region and a peripheral region which surrounds the active region,
      wherein the alignment layer is formed in the alignment region, and the light blocking pattern is formed in the light blocking region;
   forming a sealant in the seal line region;

combining the first lens substrate with a second lens substrate which includes a second base substrate, wherein the second base substrate faces the first base substrate;

providing liquid crystal in a cell gap between the first lens substrate and the second lens substrate, and in the active, alignment and light blocking regions, irradiating light onto the first lens substrate and the light blocking pattern on the first lens substrate, to solidify the sealant, forming a plurality of lens electrodes on the second base substrate; and forming a plurality of column spacers in the cell gap between the first lens substrate and the second lens substrate, wherein the plurality of columns spacers in the cell gap maintains the cell gap, wherein the plurality of column spacers in the cell gap comprises:

a plurality of first column spacers in the active region, overlapping a portion of the plurality of lens electrodes, wherein the portion of the plurality of lens electrodes has a size greater than that of the first column spacers; and a plurality of second column spacers in a portion of the alignment region which overlaps the peripheral region.

13. The method of claim 12, wherein:
the plurality of column spacers is formed on the first base substrate.

14. The method of claim 13, wherein the forming the plurality of column spacers comprises:
forming third column spacers in the light blocking region, wherein the third column spacers have a size greater than the first column spacers, and are arranged in a density greater than the first column spacers.

15. The method of claim 12, wherein:
the plurality of column spacers is formed on the second base substrate.

16. The method of claim 15, wherein the forming the plurality of column spacers comprises:
forming third column spacers in the light blocking region, wherein the third column spacers have a size greater than the first column spacers, and are arranged in a density greater than the first column spacers.

17. The method of claim 12, wherein the light blocking pattern comprises opaque metal.

18. The method of claim 12, wherein the light blocking pattern comprises opaque organic material.

19. The method of claim 12, wherein the light blocking pattern overlaps the liquid crystal in a portion of the light blocking region at which the alignment layer is not disposed, in a plan view.

20. A liquid crystal lens panel comprising:
a first lens substrate comprising:
a common electrode;
an active region,
an alignment region which overlaps an entire of the active region and extends further than the active region,
a seal line region which is outside of the alignment region,
a light blocking region which is between the seal line region and the alignment region, and
a peripheral region which surrounds the active region;
a second lens substrate which faces the first lens substrate and comprises a plurality of lens electrodes which is arranged in the active region;
an alignment layer in the alignment region
a sealant in the seal line region;
a light blocking pattern in the light blocking region;
liquid crystal in a cell gap between the first lens substrate and the second lens substrate, and in the active, alignment and light blocking regions; and
a plurality of column spacers in the cell gap between the first lens substrate and the second lens substrate, wherein the plurality of columns spacers maintains the cell gap, wherein
the light blocking pattern overlaps the liquid crystal in a portion of the light blocking region at which the alignment layer is not disposed, in a plan view, and
the plurality of column spacers comprises:
a plurality of first column spacers in the active region;
a plurality of second column spacers in a portion of the alignment region which overlaps the peripheral region; and
a plurality of third column spacers in the light blocking region, the plurality of third column spacers in the light blocking region defining a total area in the plan view greater than that of the plurality of first column spacers and greater than that of the plurality of second column spacers.

* * * * *